(12) United States Patent
Abramovitch

(10) Patent No.: US 7,472,585 B2
(45) Date of Patent: Jan. 6, 2009

(54) METHOD FOR RAPID SEEKS TO THE MEASUREMENT SURFACE FOR A SCANNING PROBE MICROSCOPE

(75) Inventor: Daniel Y Abramovitch, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 89 days.

(21) Appl. No.: 11/553,702

(22) Filed: Oct. 27, 2006

(65) Prior Publication Data

US 2008/0098804 A1    May 1, 2008

(51) Int. Cl.
*G01N 13/16* (2006.01)
*G01B 5/28* (2006.01)

(52) U.S. Cl. ........................................ 73/105; 250/307
(58) Field of Classification Search .................. 73/105; 250/306, 307
See application file for complete search history.

(56) References Cited

U.S. PATENT DOCUMENTS

| 5,847,383 | A | * | 12/1998 | Tong .......................... 250/234 |
| 5,852,232 | A | * | 12/1998 | Samsavar et al. ............. 73/105 |
| 6,265,718 | B1 | * | 7/2001 | Park et al. .................... 250/307 |
| 6,960,765 | B2 | * | 11/2005 | Tomimatsu et al. ......... 250/310 |
| 7,066,014 | B2 | * | 6/2006 | Salapaka et al. .............. 73/105 |
| 2006/0230474 | A1 | * | 10/2006 | Mininni et al. ............... 977/850 |

* cited by examiner

*Primary Examiner*—Michael Cygan

(57) ABSTRACT

In accordance with the invention, rapid surface seeks to the measurement surface by a scanning probe microscope are enabled by using an actuator coupled to a position sensor.

20 Claims, 14 Drawing Sheets

METHOD FOR RAPID SEEKS TO THE MEASUREMENT SURFACE FOR A SCANNING PROBE MICROSCOPE

BACKGROUND

Typical scanning probe microscopes (SPM) such as a typical atomic force microscope (AFM) only sense the probe tip position once the probe tip is in contact with the surface to be scanned. Typical SPMs image a measurement surface by applying a thin probe tip at the end of flexible cantilever to the measurement surface. With respect to FIG. 1, as the probe tip moves across the measurement surface, variations in the probe tip height are typically detected by the use of a laser beam reflected off the back of cantilever 130 that is received by optical detector 120. Cantilever 130 is typically actuated by piezoelectric actuator 110. Because optical detector 120 only senses the deflection of cantilever 130, e, and not the absolute position of the probe tip, the control feedback loop is known as an output error only loop. Typically, output signal u of controller 140 is used as an estimate of the measurement surface as shown in the block diagram of FIG. 1. This typically limits the bandwidth and accuracy of the measurement surface estimate u. Note that in FIG. 1 "C" designates the control portion of the SPM which includes optical detector 120 and controller 140 while "P" designates the plant which includes cantilever 130 and piezoelectric actuator 110. Furthermore, the laser beam reflected from cantilever 130 only falls near the center of optical detector 120 when the probe tip is interacting with measurement surface 105. When the probe tip is away from measurement surface 105, cantilever 130 is in an undeflected position. This means that the signal from optical detector 120 is independent of the probe tip height over measurement surface 105. Hence, the signal detected by optical detector 120 is not useful for probe tip position information until the probe tip is close enough to measurement surface 105 to interact with surface 105. This typically creates difficulties for fast seeks of measurement surface 105 because the speed of the approach to measurement surface 105 typically needs to be slow enough so that the approach can be stopped as soon as measurement surface 105 is detected by optical detector 120.

SUMMARY

In accordance with the invention, rapid surface seeks to the measurement surface by a scanning probe microscope are enabled by using an actuator coupled to a position sensor.

DETAILED DESCRIPTION

Figure 1:
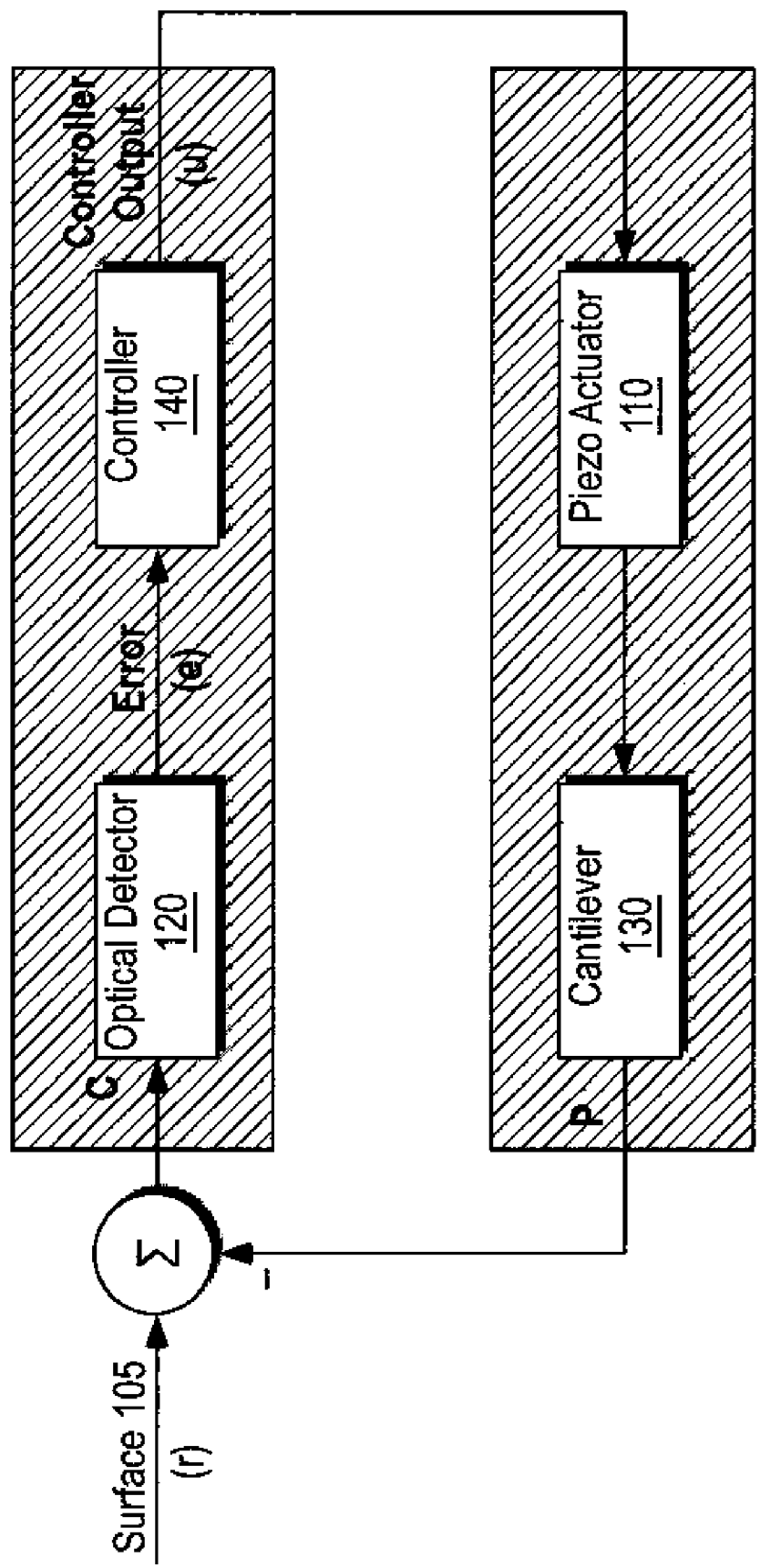
FIG. 1 shows a prior art embodiment.
Figure 2A:
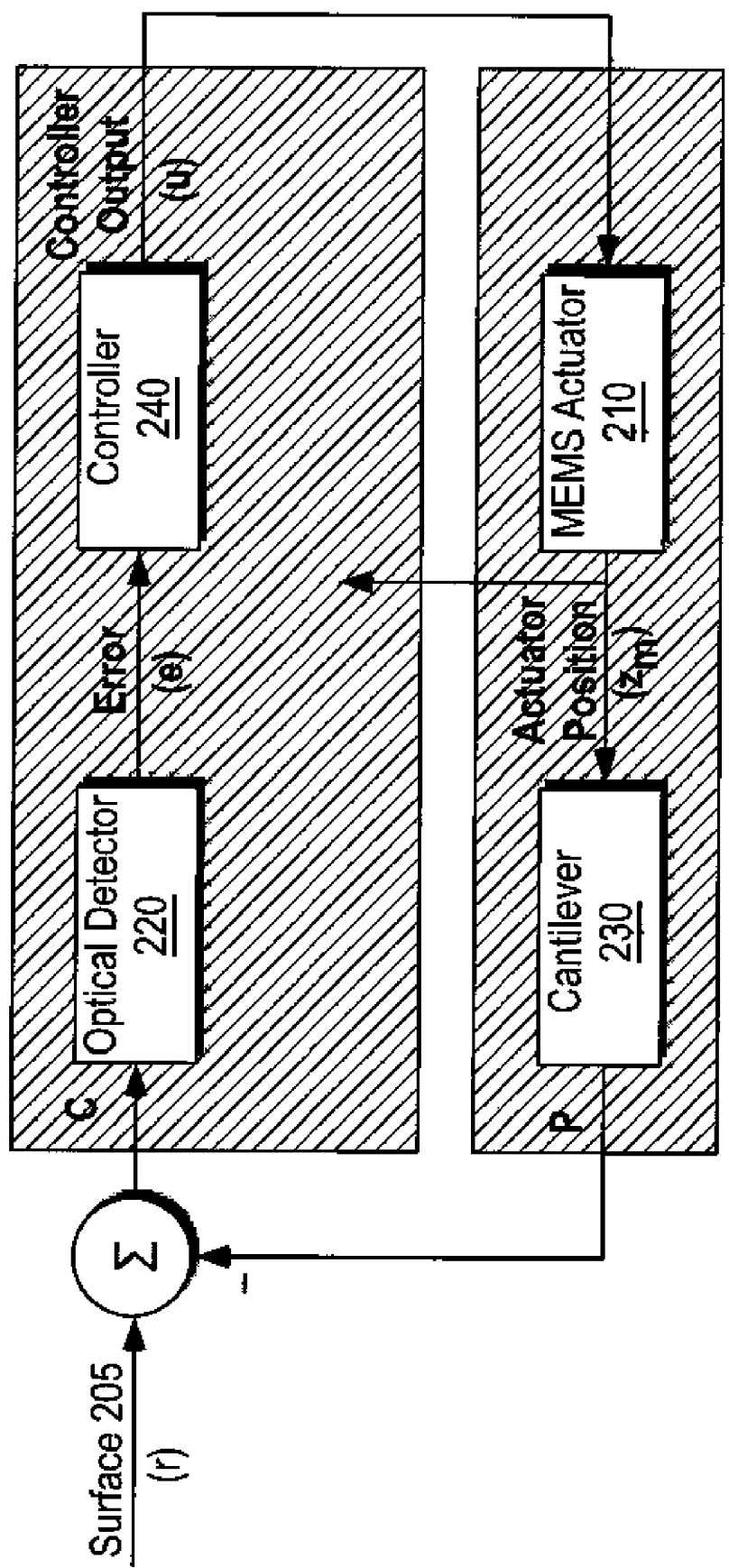
FIG. 2a shows an embodiment in accordance with the invention.
Figure 2B:
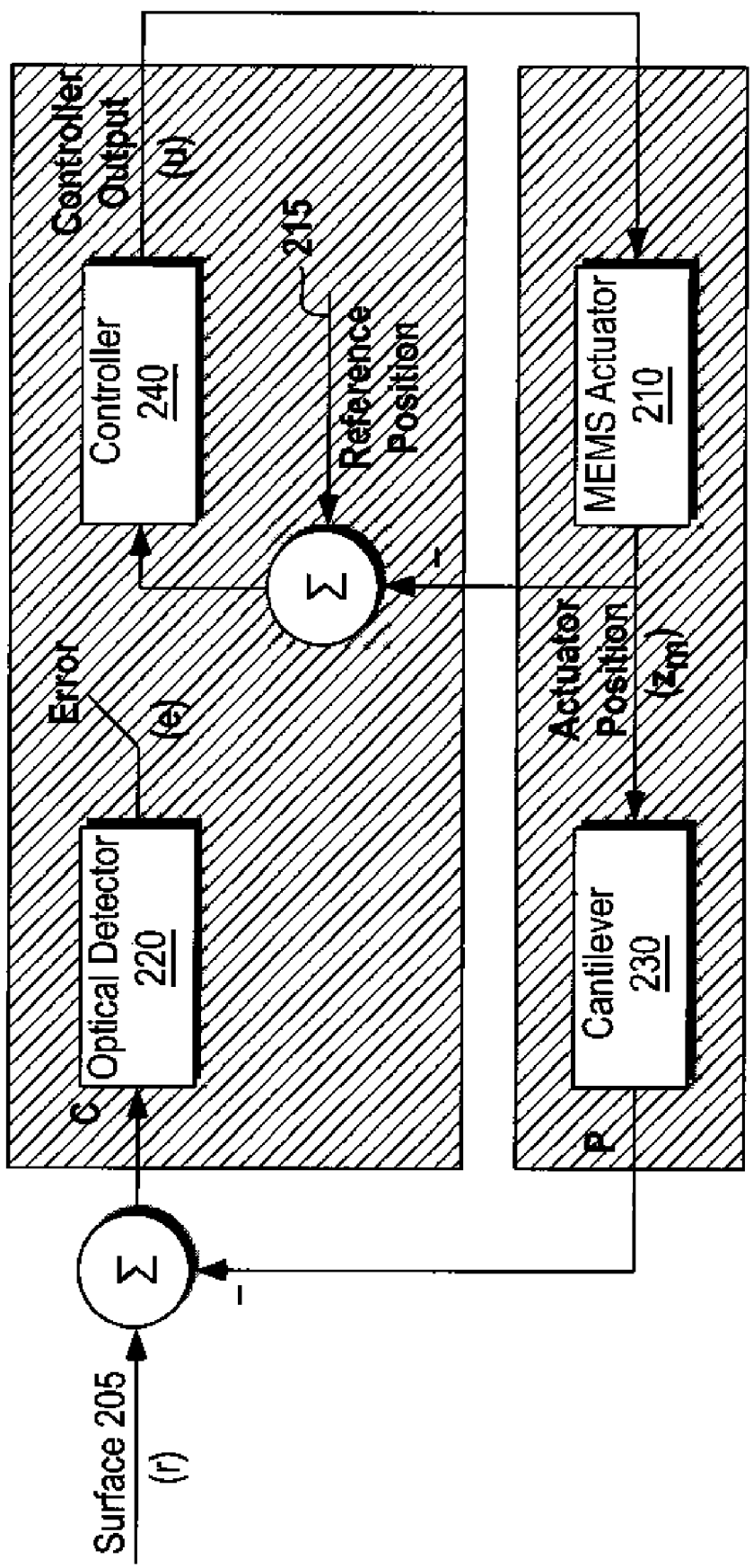
FIG. 2b shows an embodiment in accordance with the invention.

In accordance with the invention, a more rapid movement of the probe tip to the surface may be accomplished if one has a measurement of the distance of the probe tip from the measurement surface. As shown in the closed loop block diagram of FIG. 2a, a scanning probe microscope such as an AFM with MEMS actuator 210 having a position sensor can be used to determine the distance of the probe tip from measurement surface 205. The probe tip is mechanically coupled to cantilever 230. MEMS actuator 210 may, for example, be a comb drive based actuator or a MEMS actuator such as described in U.S. Pat. No. 6,657,359 and incorporated herein by reference. Optical detector 220 is sensitive to the deflection of cantilever 230 as the attached probe tip moves over measurement surface 205. The input to optical detector 220 is the interaction between the surface elevation r on measurement surface 205 and the position p of cantilever 230 which results in the movement of the reflected laser spot on optical detector 220. Optical detector 220 provides an output error feedback e to controller 240. Controller 240 outputs u, typically a surface estimate, to MEMS actuator 210. MEMS actuator 210 is used for vertical control of cantilever 230 and includes a position detector. FIG. 2b shows the situation when the probe tip is not interacting with measurement surface 205 and cantilever 230 is undeflected. The output from optical detector 220 which measures the deflection of cantilever 230 provides no useful information. However, it is still possible to close the actuator position loop to controller 240 as FIG. 2b shows by providing reference position 215 for the actuator position loop to follow. Here controller 240 outputs an estimate, u, of the position of MEMS actuator 210. The use of the actuator position loop to improve the speed of surface seeks requires an estimate of the position of MEMS actuator 210 when the probe tip first interacts with measurement surface 205. This then allows rapid surface seeks similar to those typically used for magnetic and optical disk drive actuators. However, those situations are distinguishable from the present problem because potentially small overshoots do not risk catastrophic failure that occurs here were the probe tip to have a "hard" contact with measurement surface 205 during a surface seek.

Figure 3:
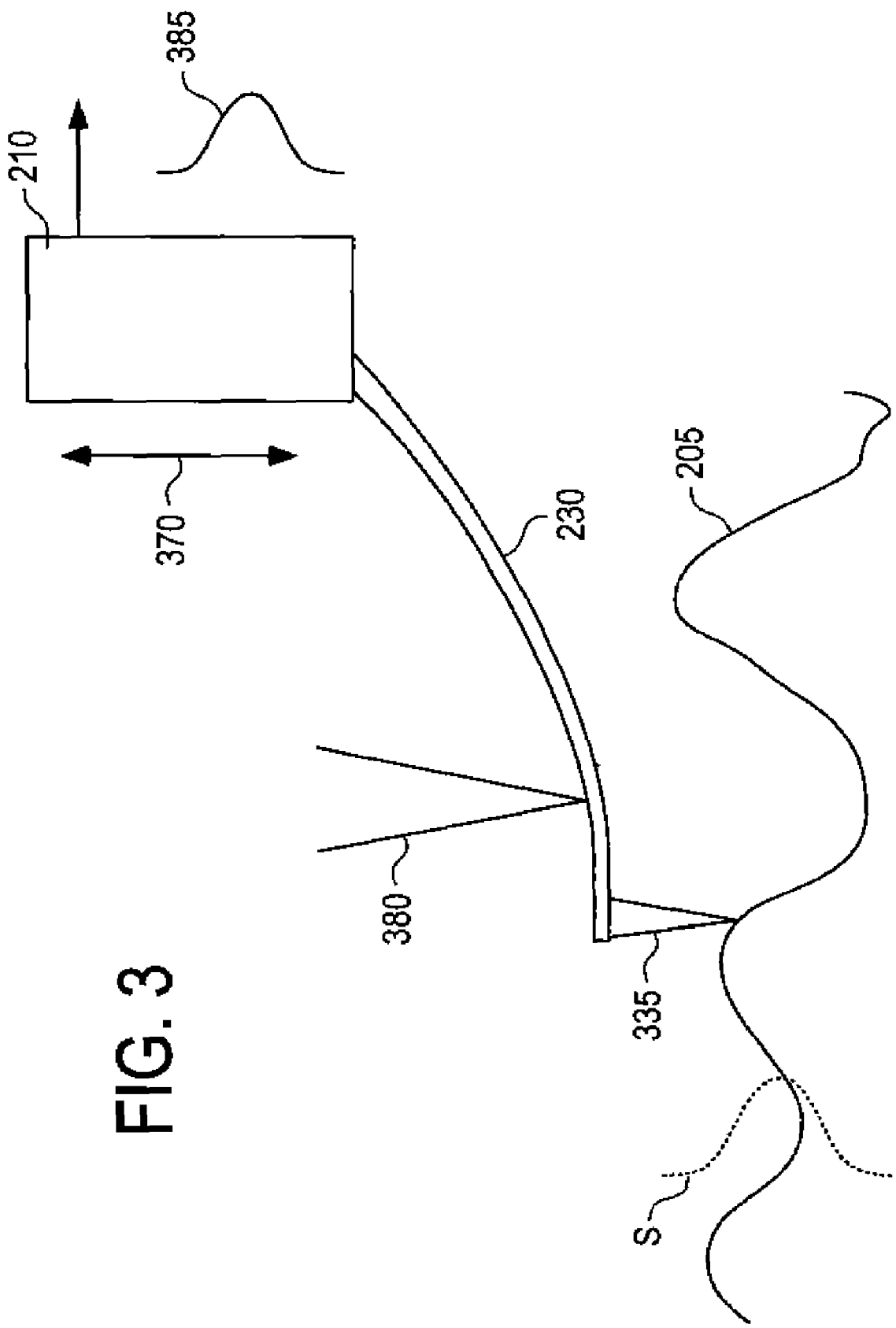
FIG. 3 shows a measurement surface in contact with a scanning probe tip.

FIG. 3 shows measurement surface 205 with statistical estimate 375 of the standard deviation, σ, of the surface height. MEMS actuator 210 moves cantilever 230 in the directions of double arrow 379 with the position detector outputting actuator position signal 385 with laser beam 380 reflecting off of cantilever 230. A typical value for the reference position 215 is the position of MEMS actuator 210 at which probe tip 335 interacts with measurement surface 205 as shown in FIG. 3. In accordance with the invention, this may be obtained by initially bringing probe tip 335 down slowly to measurement surface 205 until the output (e) from optical detector 220 changes significantly. Optical detector 220 typically determines position by taking the sum of the intensity in two adjacent quadrants (A+B) and subtracting the sum of the intensity in the two other adjacent quadrants (C+D), e.g. (A+B)−(C+D). When cantilever 230 is unflexed, one sum, say (A+B) is typically significantly larger than the other, (C+D). When probe tip 335 makes contact with measurement surface 205, the output (e) changes and the output (e) goes towards or through a zero crossing. Note that the sum of A, B, C, D is a maximum when $(A+B)-(C+D)=0$. When this occurs it is apparent that probe tip 335 is interacting with measurement surface 205. By tracking actuator position signal 385 an initial estimate for the surface position is obtained.

If measurement surface 205 were atomically flat and there were no noise from the position detector, the initial estimate for the surface position would typically be sufficient. However, as seen schematically in FIG. 3, measurement surface 205 is typically not smooth at atomic dimensions. The initial estimate for the surface position is to be considered an estimate of the mean surface height. Estimate, s, of the standard deviation, $\sigma$, of the surface height may be obtained by determining the position sensor output when surface interaction occurs with scanning probe tip 335 for multiple positions on measurement surface 205. To avoid damage to scanning probe tip 335 by hard contact with measurement surface 205, it is necessary to define region 430 about the estimate of mean surface height, $\bar{z}$ (see FIG. 4a). Region of safe approach 425 lies outside of region 430 and is where measurement surface 205 may be approached rapidly whereas inside region 430, measurement surface 205 needs to be approached slowly in "settle" mode to avoid possible damage to scanning probe tip 335. For example, for measurement surface 205 it might be established that a safe distance for the border between region 430 and region of safe approach 425 is at the 6 $\sigma$ point which is shown schematically in FIG. 4a.

To use the above method requires an estimate of the mean surface height, $\bar{z}$, as well as the standard deviation, $\sigma$, about the mean surface height, $\bar{z}$ of measurement surface 205. The typical estimate for mean surface height, $\bar{z}$ is given by:

$$\bar{z} = \frac{1}{N}\sum_{i=1}^{N} z_i \quad (1)$$

where the standard deviation, $\sigma$, is determined by first calculating the sample estimate of the variance, $\sigma^2$, and taking the square root and N is, in general, the number of scan sample points in a defined region (which here is the scanned image) times the number of scans (which here is one). The sample estimate, $s^2$, of the variance is given by:

$$s^2 = \frac{1}{(N-1)}\sum_{i=1}^{N}(z_i - \bar{z})^2 \quad (2)$$

so that the estimate of the standard deviation, $\sigma$, is given by s. Typically, the distinction between s and $\sigma$ is dropped so that $\sigma$ is the sample standard deviation, s. This provides a measure for the height, $z_{settle}$, where the seek operation is changed to "settle" mode and is given by:

$$z_{settle} = \bar{z} + c_1\sigma \quad (3)$$

where $c_1$ is an appropriate scaling constant.

Another method for determining a value for $z_{settle}$ in accordance with the invention, is to determine the minimum and maximum surface heights in a sample set:

$$z_{min} = \min_{k=1}^{N}\{z_k\} \quad (4a)$$

$$z_{max} = \max_{k=1}^{N}\{z_k\} \quad (4b)$$

and calculate the difference, $z_{diff}$, between the minimum and maximum surface heights, $z_{min}$ and $z_{max}$, respectively. This allows the determination of a value for $z_{settle}$ given by:

$$z_{settle} = z_{max} + c_2 z_{diff} \quad (5)$$

where $c_2$ is an appropriate scaling constant. The two methods given by Eq. (3) and Eq. (5) for $z_{settle}$ may be used in combination to give, for example:

$$z_{settle} = \max\{\bar{z} + c_1\sigma, z_{max} + c_2 z_{diff}\} \quad (6)$$

Another method of estimating the surface height becomes useful when surface scans are to be repeated. A first surface scan of measurement surface 205 can be obtained using the position detector of MEMS actuator 210 using the procedure described above. This first surface scan 400 can be used to provide surface height estimates and approach regions as a function of x-y position as shown in FIG. 4b. For example, darkest regions 410 indicate the greatest surface height while lightest regions 420 indicate the least surface height. Regions 410 and 420 may each be a single pixel or a group of pixels. The surface height with respect to x-y position can be used to allow faster approaches or seeks to squares on measurement surface 205.

Surface height estimates with respect to x-y position can be implemented by a variation of Eq. (1), so that the average height for an x-y position is given by:

$$\bar{z}_{i,j} = \frac{1}{N}\sum_{k=1}^{N} z_{i,j,k} \quad (7)$$

where i represents the $i^{th}$ x-position and j represents the $j^{th}$ y-position. The standard deviation at the $i^{th}$ x-position and the $j^{th}$ y-position, $\sigma_{i,j}$ is given by:

$$\sigma_{i,j} = \sqrt{\frac{1}{(N-1)}\sum_{k=1}^{N}(z_{i,j,k} - \bar{z}_{i,j})^2} \quad (8)$$

and this can be used to provide a measure for the height, $z_{i,j\ settle}$, where the seek operation is changed to "settle" mode for each approach region and is given by:

$$z_{i,j\ settle} = \bar{z}_{i,j} + c_{i,j\ 1}\sigma_{i,j} \quad (9)$$

where $c_{i,j\ 1}$ is an appropriate position dependent scaling constant.

Similarly to the above single scan method discussed above, the minimum and maximum surface height calculations may be performed by position as:

$$z_{i,j,min} = \min_{k=1}^{N}\{z_{i,j,k}\} \quad (10a)$$

$$z_{i,j,max} = \max_{k=1}^{N}\{z_{i,j,k}\} \quad (10b)$$

and calculate the difference, $z_{i,j\ diff}$, between the minimum and maximum surface heights at each position, $z_{i,j\ min}$ and $z_{i,j\ max}$, respectively. This allows the determination of a value for $z_{i,j\ settle}$ given by:

$$z_{i,j\ settle} = z_{i,j\ max} + c_{i,j\ 2} z_{i,j\ diff} \qquad (11)$$

Again the two methods given by Eq. (9) and Eq. (11) for $z_{i,j\ settle}$ may be combined to give, for example:

$$z_{i,j\ settle} = \max\{\bar{z}_{i,j} + c_{i,j\ 1}\sigma_{i,j,\ max} + c_{i,j\ 2} z_{i,j\ diff}\} \qquad (12)$$

Figure 4A:
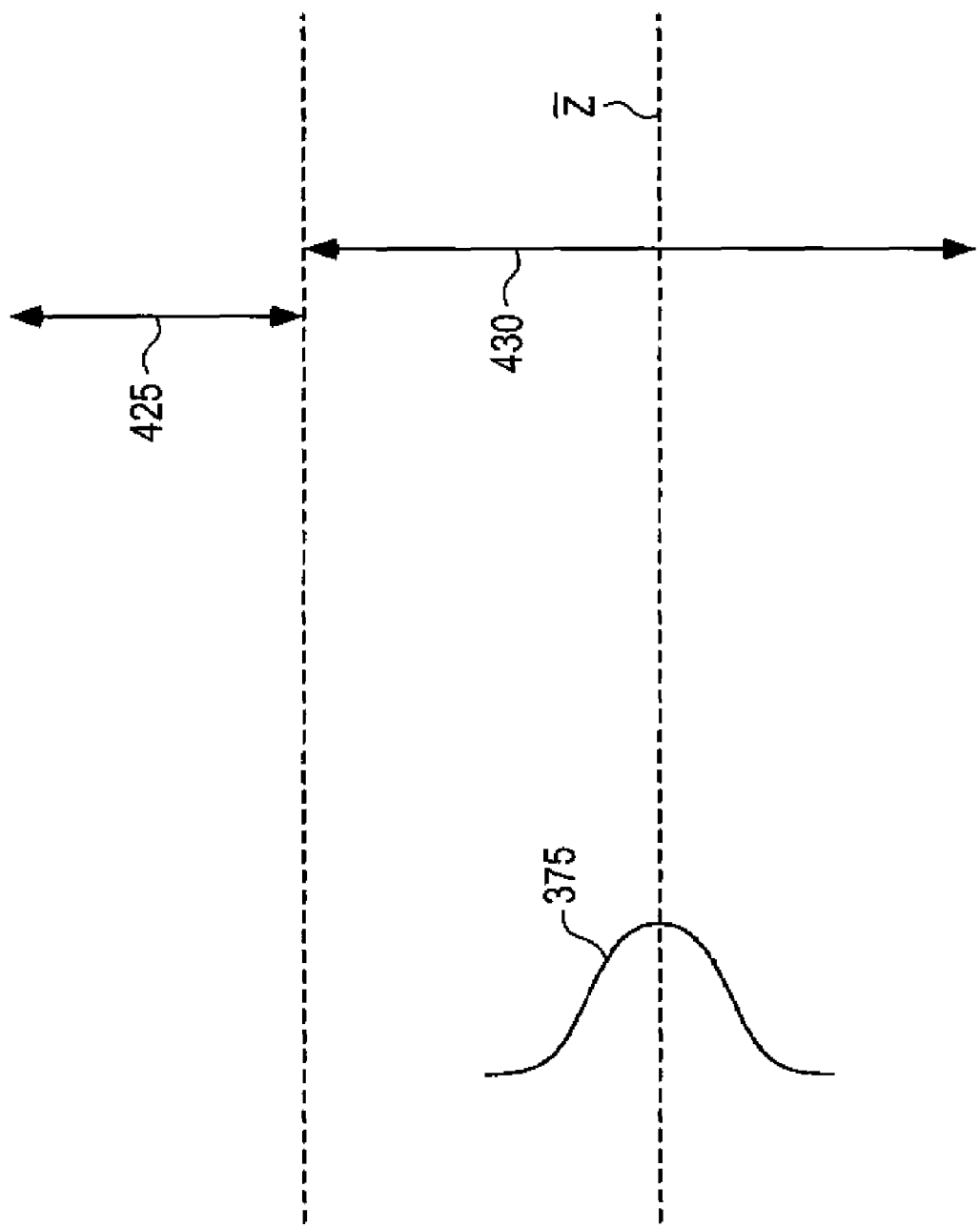
FIG. 4a schematically shows various surface height regions in accordance with the invention.
Figure 4B:
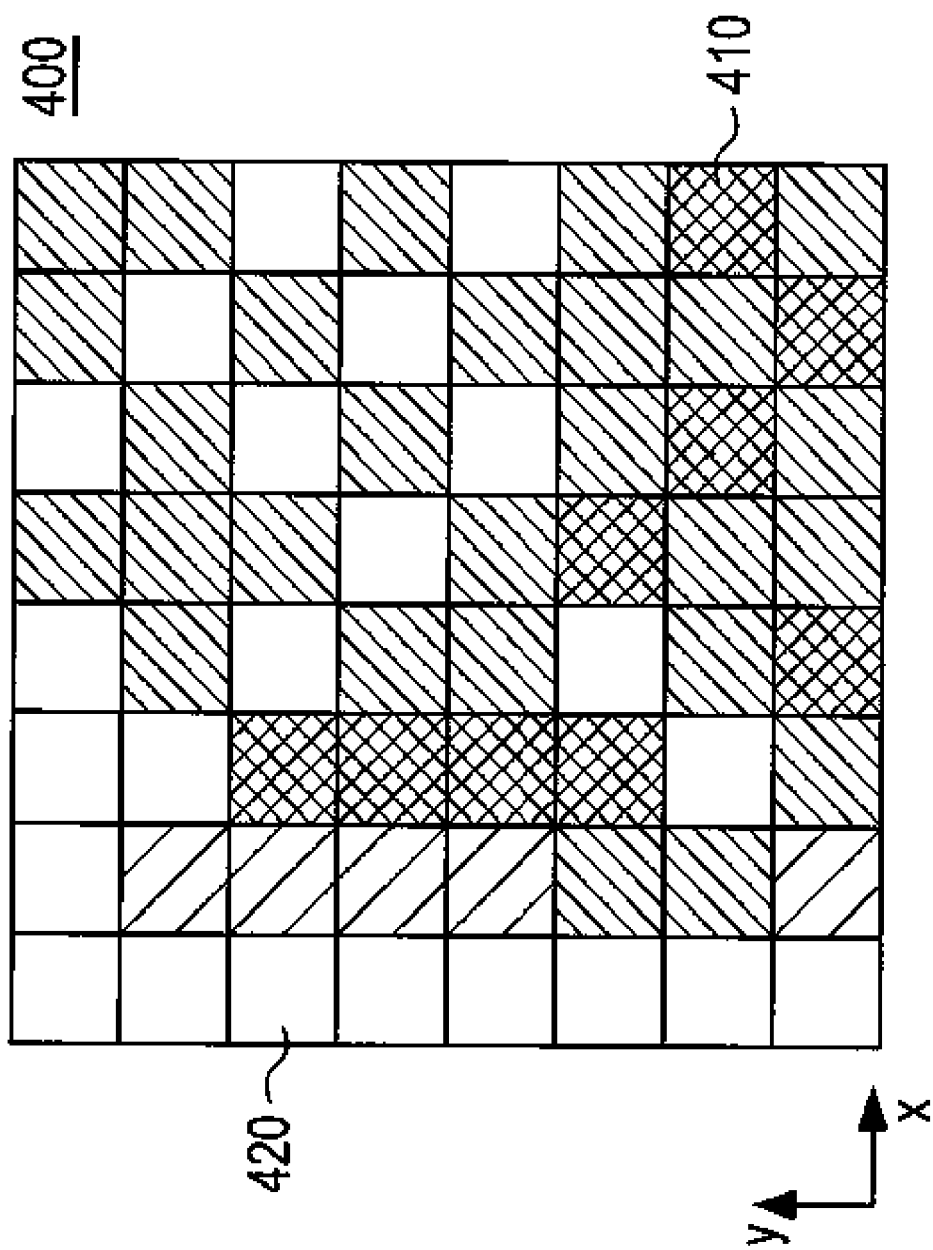
FIG. 4b shows surface height estimates as a function of x-y position in accordance with the invention.

Further surface scans result in refined measurements of the surface height which allows region 430 in FIG. 4a to be reduced in size to a zone that more accurately reflects the actual surface height variation.

Figure 5:
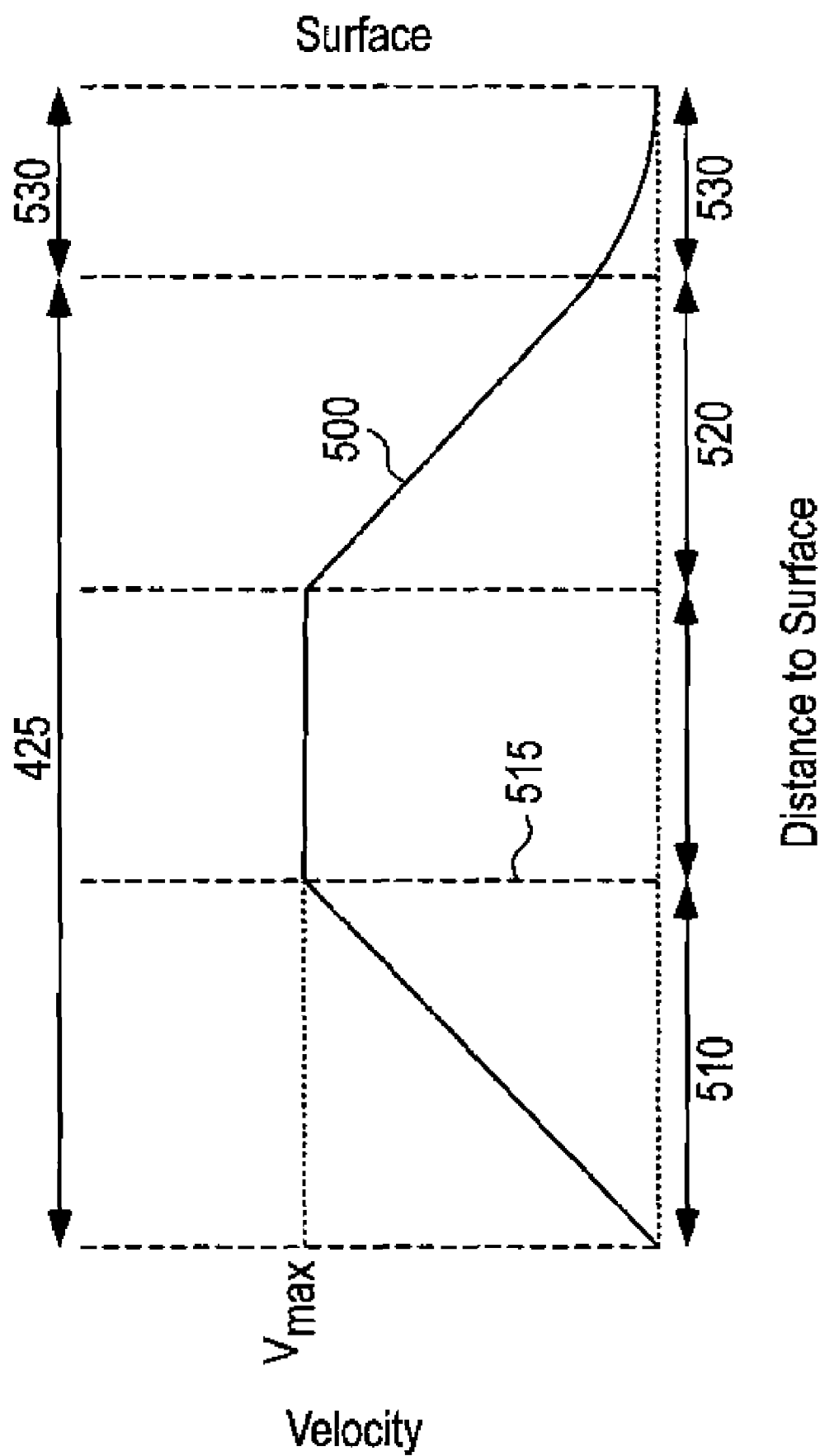
FIG. 5 shows a seek profile in accordance with the invention.

Given estimates of surface heights and regions of safe approach 425, seek or approach profile 500 may be designed as shown in FIG. 5. MEMS actuator 210 initially accelerates cantilever 230 over distance 510 until switching point 515 is reached. After switching point 515 is reached, MEMS actuator 210 may travel at maximum velocity until switching point 516 is reached when MEMS actuator 210 decelerates cantilever 230 over distance 520. In some embodiments switching point 515 and 516 may be the same point. Over distance 530, MEMS actuator 210 slowly brings cantilever 230 into its final position. Other seek or approach profiles besides seek or approach profile 500 shown in FIG. 5 may be used taking into account the dynamics of the particular MEMS or other actuator used. However, any seek or approach profile generation method that is used is enabled by a position detector that senses the position of the MEMS or other actuator.

In accordance with the invention, the position of scanning probe tip 335 is typically determined by three distinct components: a high quality, relatively coarse movement stepper motor which is typically capable of moving the entire positioning stage including MEMS actuator 210 vertically on the order of a few millimeters; MEMS actuator 210 which typically is capable of moving cantilever 230 vertically on the order of about 20 µm; and cantilever 230 which typically deflects vertically on the order of about 20 nm to about 100 nm. The stepper motor (not shown) is mechanically coupled to MEMS actuator 210 and operates to move MEMS actuator 210 up and down as indicated by arrows 370 in FIG. 3. Hence, a surface seek depends on the starting height. A seek region is defined given an estimate of the surface height as described by one of the methods above. If the surface height estimate is within the range of MEMS actuator 210, then only MEMS actuator 210 is involved in the seek to measurement surface 205. If the surface height is outside the vertical motion range of MEMS actuator 210, the stepper motor needs to be used as well. Note, that as an alternative, the stepper motor may be coupled to the sample stage on which measurement surface 205 is located and the stepper motor operates to raise and lower the sample stage. In this example, MEMS motor 210 typically does not move up and down.

Figure 6:
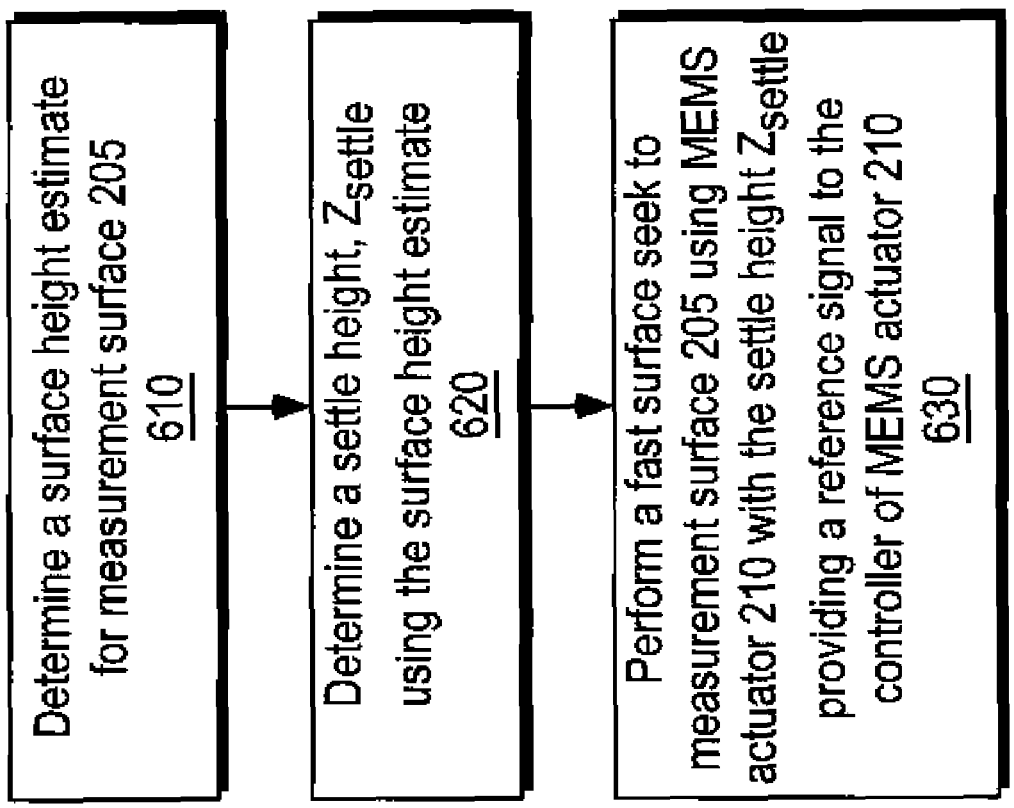
FIG. 6 shows an embodiment in accordance with the invention.

When the initial position above measurement surface 205 is within the range of MEMS actuator 210, the stepper motor is typically not used to drive the positioning stage. This situation typically occurs if a non-raster scan is performed or the tip is moved off surface 205 at the conclusion of a measurement. In accordance with the invention, a surface seek is performed as shown in FIG. 6. In step 610, a surface height estimate is determined, typically using on of the methods described above. In step 620, a height, $z_{settle}$ is established at which to transition to "settle" mode. In step 630, a surface seek is performed to the height, $z_{settle}$ from an initial position above measurement surface 205 that is within the range of MEMS actuator 210.

Figure 7A:
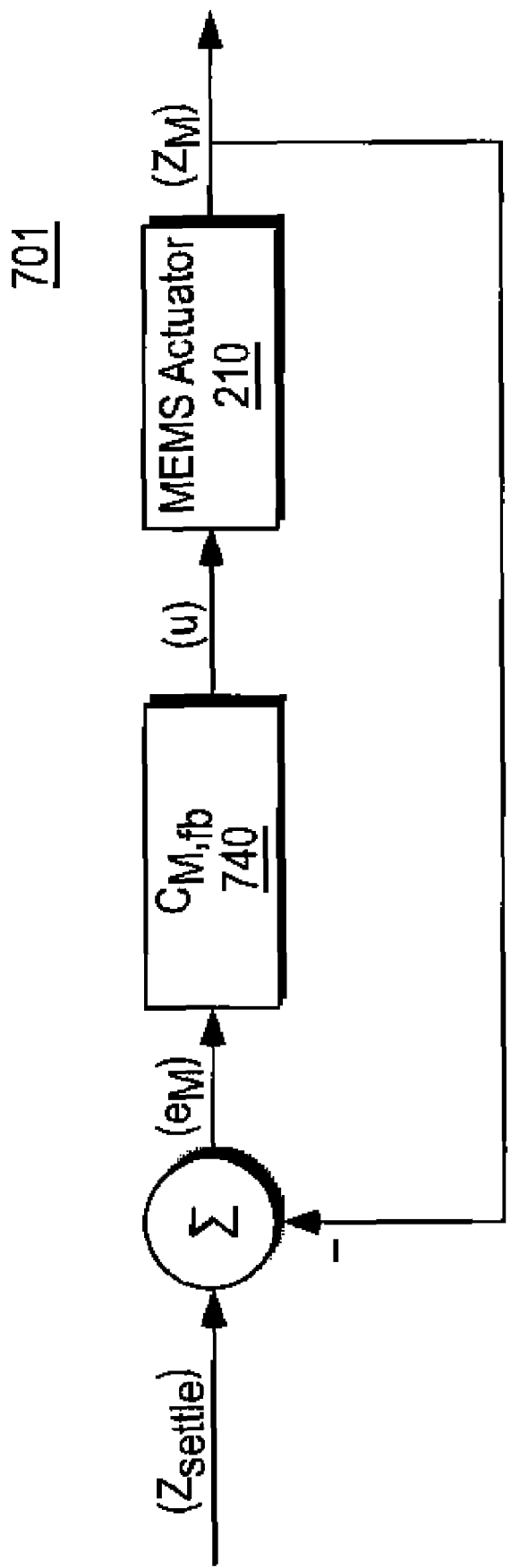
FIGS. 7a-7e show embodiments in accordance with the invention.

The surface seek to the height, $z_{settle}$, may be performed using any of a number of different embodiments in accordance with the invention. An exemplary embodiment is shown in FIG. 7a. In embodiment 701 shown in FIG. 7a, the height, $z_{settle}$, is input directly as the reference position and controller feedback loop 740 and MEMS actuator 210 will operate to drive MEMS actuator 210 to the reference position, $z_{settle}$. The availability of the output, $z_M$, of position sensor on MEMS actuator 740 allows embodiment 701 to drive MEMS actuator 210 to the reference position, $z_{settle}$. If controller feedback loop 740 is represented by the transfer function $C_{M,fb}$ in the frequency domain and MEMS actuator 210 is represented by transfer function $P_M$ in the frequency domain, the output of the position sensor, $Z_M(f)$, is related to the input, $z_{settle}(f)$ in the frequency domain by the transfer function where f is a general frequency variable:

$$Z_M(f) = \frac{P_M C_{M,fb}}{1 + P_M C_{M,fb}} Z_{settle}(f) \qquad (13)$$

From Eq. (13) it is clear that as long as MEMS actuator 210 does not saturate and $P_M C_{M,fb}$ is large with respect to unity, $Z_M$ will track $Z_{settle}$.

Figure 7B:
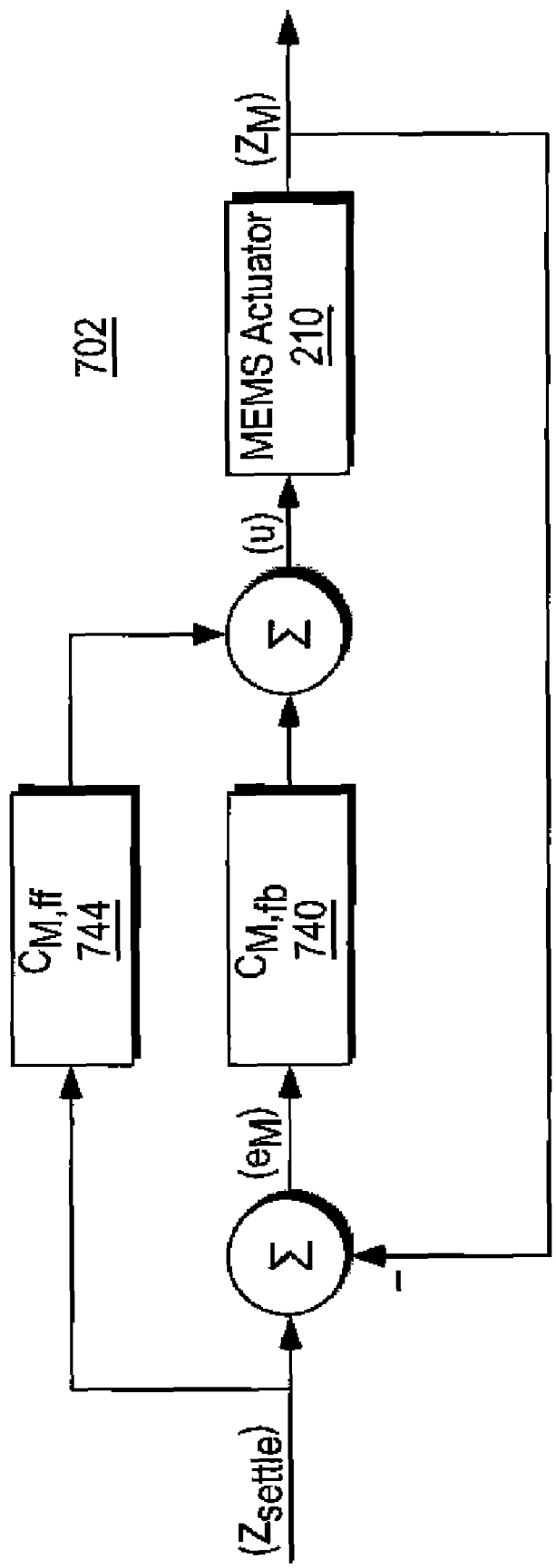

Another exemplary embodiment is shown in FIG. 7b. In embodiment 702 improved performance is typically obtained by adding feedforward block 744 as shown in FIG. 7b. The addition of feedforward block 744 typically improves the dynamics by moving the reference position, $z_{settle}$, into MEMS actuator 210 without the delay of passing through controller feedback loop 740. Representing feedforward block 744 by $C_{M,ff}$ then gives for FIG. 7b:

$$Z_M(f) = \frac{P_M C_{M,fb}}{1 + P_M C_{M,fb}} Z_{settle}(f) + \frac{P_M C_{M,ff}}{1 + P_M C_{M,fb}} Z_{settle}(f) \qquad (14)$$

which if $C_{M,ff} \approx P_M^{-1}$ gives:

$$Z_M(f) \approx \frac{P_M C_{M,fb}}{1 + P_M C_{M,fb}} Z_{settle}(f) + \frac{1}{1 + P_M C_{M,fb}} Z_{settle}(f) = Z_{settle}(f) \qquad (15)$$

Figure 7C:
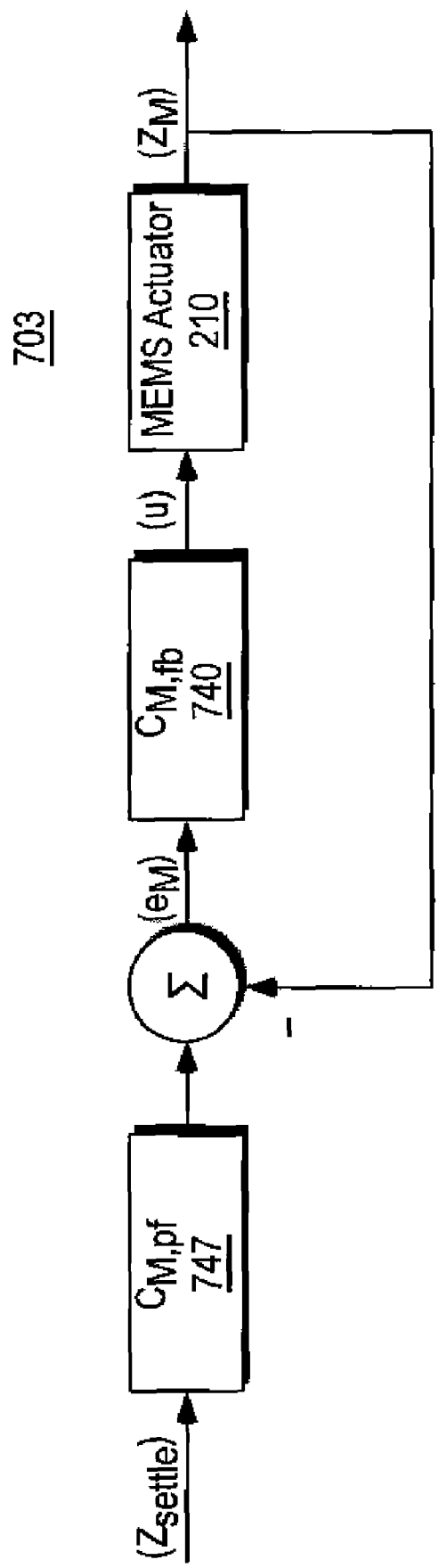

Another exemplary embodiment is shown in FIG. 7c. In embodiment 703, prefilter block 747 is used in place of feedforward block 744. If $$C_{M,pf} \approx \frac{1 + P_M C_{M,fb}}{F} \qquad (16)$$

where prefilter block 747 is represented by $C_{M,pf}$ and F is the filter then $$Z_M(f) = C_{M,pf} \frac{P_M C_{M,fb}}{1 + P_M C_{M,fb}} Z_{settle}(f) \approx \frac{P_M C_{M,fb}}{F} Z_{settle}(f) \qquad (17)$$

Choosing the filter, F to be $F = P_M C_{M,fb} F_{LP}$ with $F_{LP}$ a low pass filter selected to remove high frequency noise gives:

$$Z_M(f) \approx \frac{1}{F_{LP}} Z(f)_{settle}. \quad (18)$$

Any of the above embodiments in FIGS. 7a-7c can be implemented using state space methods. This allows the application of methods such as Linear Quadratic Gaussian (LQG) or H$^\infty$ control with a reference input to remove the system dynamics from the response. With a state space control system, the gains are defined by the system model and the optimization criteria. Furthermore, nonlinear components such as MEMS actuator saturation can be accommodated in the state space model.

Figure 7D:
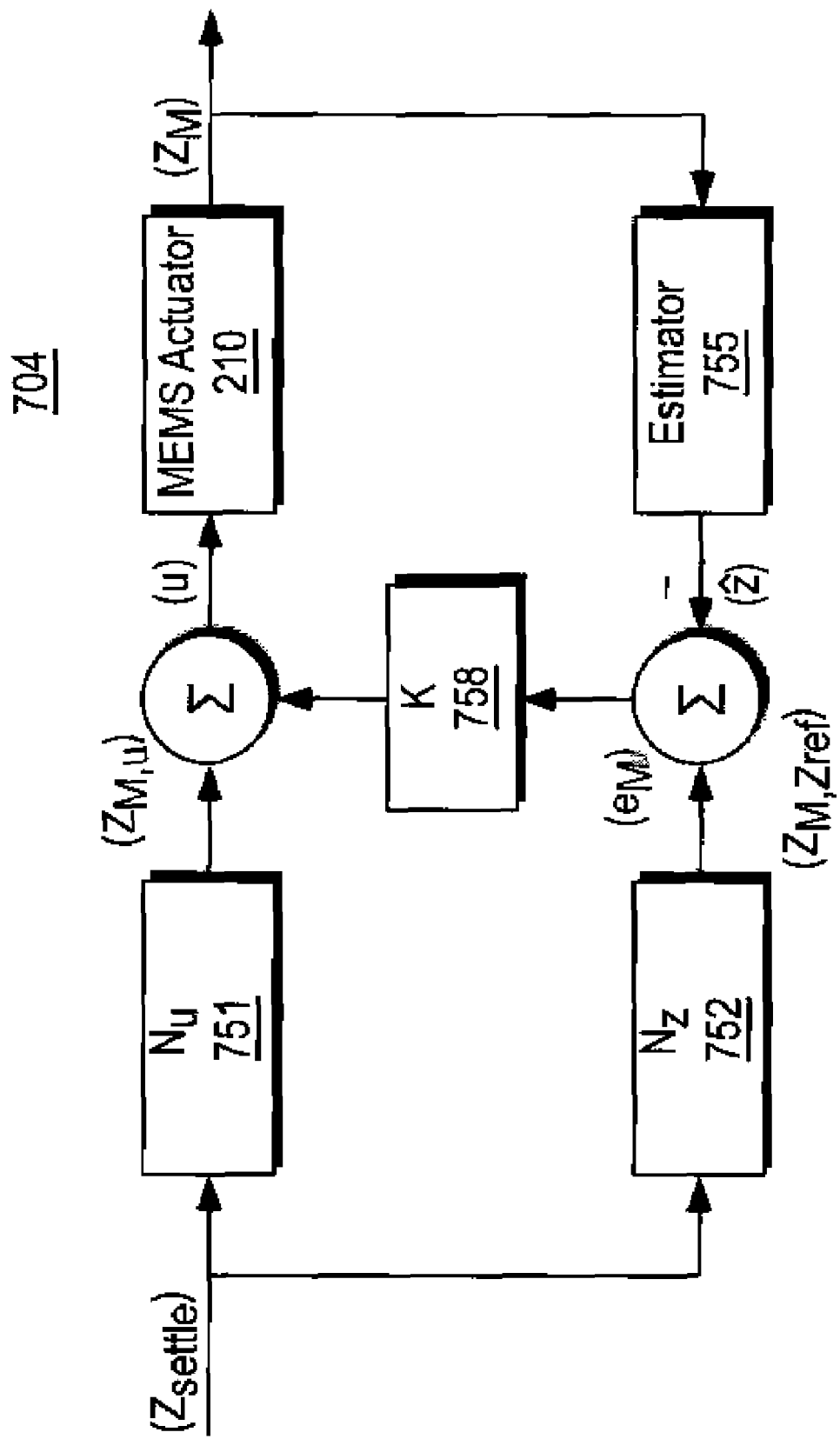

FIG. 7d shows an exemplary embodiment implemented using state space methods. In embodiment 704, block 751 implements reference input gain matrix, $N_u$, of the state space controller and is computed from the system model and the state feedback gain, K, of block 758. Reference input gain matrix, $N_u$, receives the reference height, $z_{settle}$, and generates $z_{M,u}$ which drives the steady state error to zero. Estimator 755 receives the measured output of the position sensor of MEMS actuator 210 and outputs the state estimate, $\hat{z}$. Block 751 implements gain matrix, $N_z$, which receives the reference height, $z_{settle}$, and generates the reference state, $Z_{M,Zref}$ which is used together with state estimate, $\hat{z}$ to generate the error, $e_M = (Z_{M,Zref} - \hat{z})$. The error, $e_M$, is scaled by the state feedback gain, K.

Figure 7E:
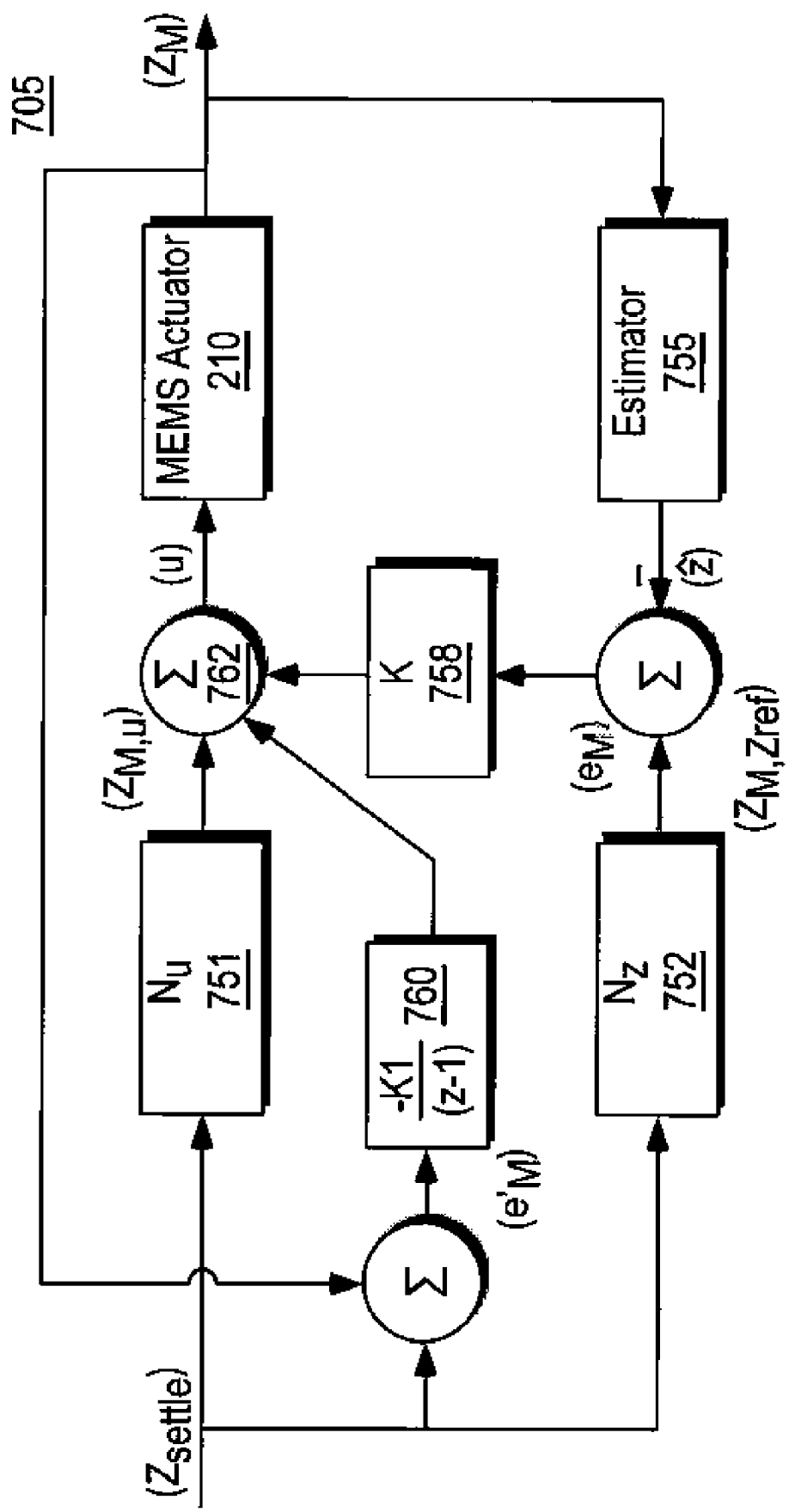

FIG. 7e shows an exemplary embodiment implemented similar to embodiment 704 using state space methods along with integrator 760. Integrator block 760 implements the integrator in a discrete time form, for example, $K_1/(z-1)$, and operates to cause the stable closed-loop system to have zero steady state error in response to a step input. Integrator block 760 receives the error, $e'_M = (z_{settle} - z_M)$ which is output to summing block 762. Integrator block 760 may include an anti-windup mechanism to accommodate the situation if the control signal saturates.

If the speed of the seek is pushed to the point that limits of MEMS actuator 210 are reached, then a time optimal or Proximate Time optimal control method may be used. However, these systems are less well studied of multi-resonant systems.

The stepper motor is typically needed as part of a surface seek when scanning probe tip 335 has been moved away to replace a sample, MEMS actuator or scanning probe tip 335. The stepper motor is used in accordance with the invention to position the scanning probe tip 335 within the range of MEMS actuator 210. Typically, a stepper motor is provided with a maximum speed rating. Hence, the position commands to the stepper motor are such that the speed ramps up to maximum speed, maintains that speed and then decelerates to zero. The precise shape of the trapezoidal speed curve depends on the steeper motor ratings and the distance of travel to the range of MEMS actuator 210. The position commands can be prefiltered to remove any frequencies that would excite the dynamics of MEMS actuator 210 or cantilever 230.

Figure 8:
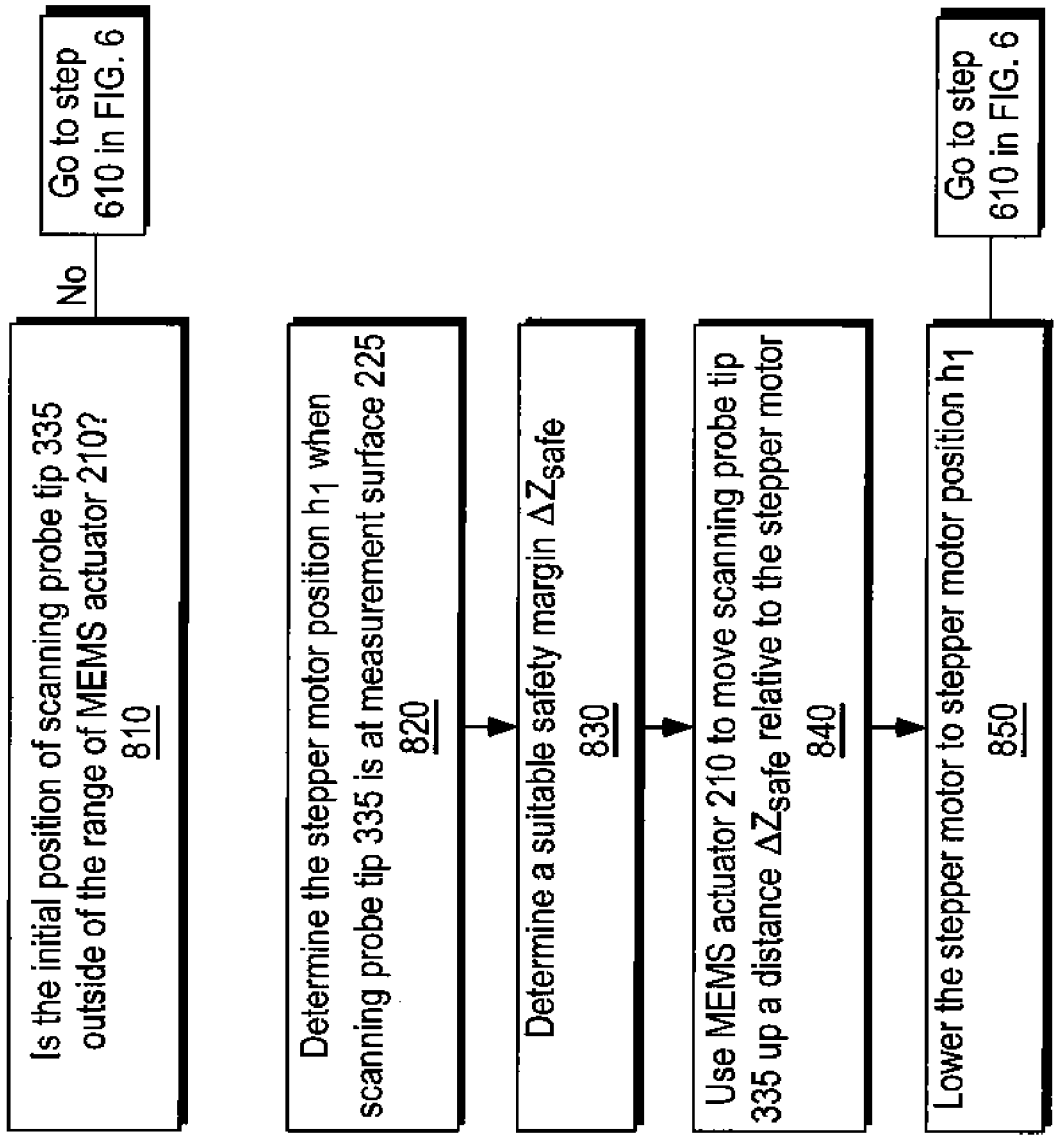
FIG. 8 shows an embodiment in accordance with the invention.

In accordance with the invention, a method for a seek using the stepper motor is shown in FIG. 8. In step 810, it is determined whether the present position of the scanning probe tip 335 is outside of the range of MEMS actuator 210. If it is not, one proceeds to step 610 in FIG. 6. In step 820, if the present position is outside the range of MEMS actuator 210, determine the stepper motor position, $h_1$, when the scanning probe tip 335 is at measurement surface 205. In step 830, determine a suitable safety margin $\Delta z_{safe}$, for example, $c_3 \sigma + c_4 z_{diff}$ where $c_3$ and $c_4$ are appropriate scaling parameters. In step 840, MEMS actuator 210 is used to move up scanning probe tip 335 a distance $\Delta z_{safe}$ relative to the stepper motor. In step 850, the stepper motor is moved into position $h_1$. Note that because MEMS actuator 210 has been moved up a distance $\Delta z_{safe}$ relative to the stepper motor, scanning probe tip 335 will not be at measurement surface 205. Finally, MEMS actuator 210 is lowered as described above and shown in FIG. 6.

It should be noted that while the embodiments in accordance with the invention are described with respect to MEMS actuator 210, it is to be understood that any appropriate actuator having a position sensor, such as a piezoelectric actuator with a position sensor, may be used in accordance with the invention.

The invention claimed is:

1. A method for operating a scanning probe microscope to measure a property of a measurement surface, said microscope having a probe tip and an actuator mechanically coupled to said probe tip and coupled to a position sensor, said method comprising:
    making an initial determination of a settle height, said initial determination comprising:
        bringing said probe tip towards said measurement surface at a first point on said measurement surface and at a first speed while measuring interactions between said probe tip and said surface to determine a first surface height estimate for said measurement surface; and
        determining a first settle height using said first surface height estimate;
    and scanning said measurement surface at a plurality of points on said measurement surface, said scanning comprising:
        moving said probe tip to a first vertical position over said measurement surface at a second speed greater than said first speed, wherein said position is determined by said determined first settle height; and
        measuring said property of said measurement surface with said probe tip, wherein said probe tip is moved vertically relative to said measurement surface at a third speed that is less than said second speed, wherein said determined first settle height functions to provide a reference signal to a controller of said actuator.

2. The method of claim 1 wherein said measurement surface comprises a plurality of surface positions having different surface heights, wherein said bringing said probe tip towards said measurement surface at a first speed is carried out at each of said plurality of surface positions, generating a corresponding plurality of surface height estimates; and wherein determining said first surface height estimate comprises determining an average surface height from said plurality of surface height estimates.

3. A method for a scanning probe microscope for performing a fast surface seek with a scanning probe tip to a measurement surface comprising a plurality of surface heights comprising:
    determining a surface height estimate for said measurement surface;
    determining a settle height using said surface height measurement; and
    performing said fast surface seek to said measurement surface with an actuator coupled to a position sensor, said actuator mechanically coupled to said scanning probe tip wherein said settle height functions to provide a reference signal to a controller of said actuator;

wherein determining said settle height comprises determining a standard deviation of said plurality of surface height estimates.

4. The method of claim 2 wherein determining said first settle height comprises determining a minimum height and a maximum height from said plurality of surface height estimates.

5. The method of claim 4 wherein determining said first settle height comprises determining a difference between said maximum height and said minimum height.

6. A method for a scanning probe microscope for performing a fast surface seek with a scanning probe tip to a measurement surface comprising a plurality of surface heights comprising:
   determining a surface height estimate for said measurement surface;
   determining a settle height using said surface height measurement; and
   performing said fast surface seek to said measurement surface with an actuator coupled to a position sensor, said actuator mechanically coupled to said scanning probe tip wherein said settle height functions to provide a reference signal to a controller of said actuator,
   wherein determining said settle height comprises determining an average surface height from said plurality of surface height estimates, determining a standard deviation of said plurality of surface height estimates, determining a minimum height and a maximum height from said plurality of surface height estimates, and determining a difference between said maximum height and said minimum height.

7. The method of claim 1 further comprising determining a second surface height estimate at a second point on said measurement surface that is different from said first point on said measurement surface.

8. The method of claim 1 further comprising determining a second settle height.

9. The method of claim 1 wherein said first surface height estimate depends on said first point on said measurement surface.

10. The method of claim 1 wherein said settle height depends on said first point on said measurement surface.

11. method of claim 1 wherein said actuator is a MEMS actuator.

12. The method of claim 1 wherein said actuator is a piezoelectric actuator.

13. The method of claim 1 wherein said controller comprises a feedback controller.

14. The method of claim 1 wherein said controller comprises a feedforward block.

15. The method of claim 1 wherein said controller comprises a prefilter for said reference signal.

16. The method of claim 1 wherein said controller comprises a state space controller.

17. The method of claim 16 wherein said state space controller comprises an integrator.

18. A method for performing a fast surface seek to a measurement surface comprising a plurality of surface heights for a scanning probe microscope comprising: determining an initial position of a scanning probe tip mechanically coupled to an actuator coupled to a position sensor, said actuator mechanically coupled to a stepper motor of said scanning probe microscope with respect to said measurement surface;
   determining a position of said stepper motor when said scanning probe tip is at said scanning measurement surface;
   determining a safety margin height from said determined position;
   raising said scanning probe tip by said safety margin height with respect to said stepper motor; and
   lowering said stepper motor to said position.

19. The method of claim 18 further comprising:
   determining a surface height estimate for said measurement surface;
   determining a settle height using said surface height measurement; and
   performing said fast surface seek with said actuator to said measurement surface,
   wherein said settle height functions to provide a reference signal to a controller of said actuator.

20. The method of claim 19 wherein said actuator is a MEMS actuator.

* * * * *

UNITED STATES PATENT AND TRADEMARK OFFICE
CERTIFICATE OF CORRECTION

PATENT NO. : 7,472,585 B2  Page 1 of 1
APPLICATION NO. : 11/553702
DATED : January 6, 2009
INVENTOR(S) : Daniel Y Abramovitch It is certified that error appears in the above-identified patent and that said Letters Patent is hereby corrected as shown below:

In column 10, line 1, in Claim 11, before "method" insert -- The --.

Signed and Sealed this

Fourteenth Day of July, 2009

JOHN DOLL
*Acting Director of the United States Patent and Trademark Office*